(12) United States Patent
Graf (10) Patent No.: US 11,192,118 B2
(45) Date of Patent: Dec. 7, 2021

(54) METHOD AND DEVICE FOR SEPARATING COMPOSITE MATERIALS AND MIXTURES, IN PARTICULAR SOLID-MATERIAL MIXTURES AND SLAGS

(71) Applicant: Deniz Graf, Uerikon (CH)

(72) Inventor: Deniz Graf, Uerikon (CH)

( * ) Notice: Subject to any disclaimer, the term of this patent is extended or adjusted under 35 U.S.C. 154(b) by 131 days.

(21) Appl. No.: 15/757,396

(22) PCT Filed: Sep. 3, 2015

(86) PCT No.: PCT/EP2015/070159
§ 371 (c)(1),
(2) Date: Mar. 5, 2018

(87) PCT Pub. No.: WO2017/036534
PCT Pub. Date: Mar. 9, 2017

(65) Prior Publication Data
US 2019/0022717 A1    Jan. 24, 2019

(51) Int. Cl.
*B02C 18/18* (2006.01)
*B02C 13/18* (2006.01)
(Continued)

(52) U.S. Cl.
CPC ............ *B02C 18/18* (2013.01); *B02C 13/185* (2013.01); *B02C 13/1807* (2013.01);
(Continued)

(58) Field of Classification Search
CPC ... B02C 18/18; B02C 2018/188; B02C 13/18; B02C 13/2804; B02C 13/288;
(Continued)

(56) References Cited

U.S. PATENT DOCUMENTS 1,727,156 A * 9/1929 Battey .................. B02C 13/282
241/88.3
9,192,940 B2 * 11/2015 Muther .................. B29B 17/04

FOREIGN PATENT DOCUMENTS

CN    103237639 A    8/2013
DE    4227308 A1    3/1994
(Continued)

OTHER PUBLICATIONS

Grebenkin—WO 2016/010460 A1—Translated Feb. 22, 2021 (Year: 2016).*
(Continued)

*Primary Examiner* — Debra M Sullivan
*Assistant Examiner* — Matthew Kresse
(74) *Attorney, Agent, or Firm* — Bachman and Lapointe PC; George Coury (57) ABSTRACT

A method for separating composite materials and mixtures, in particular solid-material mixtures and slags, and to a device for carrying out said method. The method for separating composite materials and mixtures comprises the step of transporting the composite material or the mixture through a separating device. The composite material to be separated or the mixture to be separated is excited by mechanical impulses as it passes through the separating device and is thereby separated. The device (1) for carrying out the method comprises a drive unit (21) for driving a rotor element (32), which is connected to a bearing/shaft unit (22) and which is part of a rotor unit (31). The rotor element itself has at least one rotor tool (33) and each rotor tool has at least one rotor tool component (34) and is surrounded by a stator element (42), which is part of a stator unit (41). The stator element itself has at least one stator tool (43) and each stator tool has at least one stator tool component (44). The rotor element and the stator element are substantially cylindrical.

4 Claims, 7 Drawing Sheets

(51) Int. Cl.
    *B09B 3/00* (2006.01)
    *B29B 17/02* (2006.01)
    *B09B 5/00* (2006.01)
    *B02C 23/18* (2006.01)
    *B02C 23/24* (2006.01)
    *B02C 13/14* (2006.01)
    *B03B 9/04* (2006.01)
    *B03B 9/06* (2006.01)
    *B29L 30/00* (2006.01)
    *B29L 31/34* (2006.01)
    *B29L 31/00* (2006.01)
    *B29L 9/00* (2006.01)
    *B29B 17/04* (2006.01)

(52) U.S. Cl.
    CPC .............. *B02C 23/18* (2013.01); *B02C 23/24* (2013.01); *B03B 9/04* (2013.01); *B03B 9/061* (2013.01); *B09B 3/00* (2013.01); *B09B 3/0016* (2013.01); *B09B 5/00* (2013.01); *B29B 17/02* (2013.01); *B29B 17/0206* (2013.01); *B02C 2013/145* (2013.01); *B02C 2018/188* (2013.01); *B09B 2220/06* (2013.01); *B29B 2017/0217* (2013.01); *B29B 2017/0227* (2013.01); *B29B 2017/0268* (2013.01); *B29B 2017/0492* (2013.01); *B29L 2009/00* (2013.01); *B29L 2009/003* (2013.01); *B29L 2030/00* (2013.01); *B29L 2031/3425* (2013.01); *B29L 2031/3462* (2013.01); *B29L 2031/7164* (2013.01); *Y02W 30/52* (2015.05); *Y02W 30/62* (2015.05)

(58) Field of Classification Search
    CPC ......... B02C 23/18; B02C 23/24; B02C 23/26; B02C 23/28; B02C 23/30; B02C 23/32; B02C 23/34; B02C 18/184; B02C 18/26; B02C 13/1807; B02C 13/282; B02C 2013/2825; B09B 3/0016; B29B 17/0206; B29B 17/0492; B03B 9/04; B03B 9/061
    USPC .................................................. 241/57, 242
    See application file for complete search history.

(56) References Cited

FOREIGN PATENT DOCUMENTS

| | | | |
|---|---|---|---|
| DE | 102004001305 A1 | 8/2005 | |
| WO | 2006117065 A1 | 11/2006 | |
| WO | WO-2016010460 A1 * | 1/2016 | ............. B02C 13/14 |

OTHER PUBLICATIONS

International search report for patent application No. PCT/EP2015/070159 dated May 4, 2016.

\* cited by examiner

METHOD AND DEVICE FOR SEPARATING COMPOSITE MATERIALS AND MIXTURES, IN PARTICULAR SOLID-MATERIAL MIXTURES AND SLAGS

BACKGROUND OF THE INVENTION

The present invention relates to a method and to a device for disassociating, i.e. decomposing, and segregating composite materials and mixtures, in particular solid-material mixtures and slags.

It is to be noted that, in this context, the terms disassociating, separating and decomposing mean that the different materials that are part of the composite material or of the mixture are detached from each other, i.e. that a separation along the contact surface is effected. Consequently, decomposing does not describe a classic chemical digestion (e.g. in acid) in this case, but instead exactly the described detachment of the different materials (e.g. wood, metal, plastic, etc.) in the composite material or in the mixture from each other. While the materials are subsequently no longer connected to each other, they are not yet separated spatially. A spatial separation of the materials is achieved by segregation. Subsequent to segregation, which describes a sort of grouping of the different materials, the segregated individual components, i.e. the recyclable materials, of the original composite material or mixture are obtained.

The complexity of problems of waste disposal is well known and constitutes one of the biggest challenges of our time. In addition to waste that occurs during production of consumables and economic goods, waste that occurs after their use (end of life) in particular is also an increasing problem with global impact on the environment.

Aside from the waste problem as such, the supply of the industry with raw materials exacerbates the problem because of shortages. It is fair to speak of a future supply/disposal problem in this context. The resulting feedback effects may confront our society with rapidly mounting challenges. This problem can be massively eased through strict and energy-efficient recycling management of the raw materials.

A strong increase in the use of composite materials also adds to the complication of recycling management. Composite material is the term for a material that consists of two ore more connected materials and whose material properties differ from those of the individual components. Thus, composite materials are a combination of different materials that has improved specific properties, such as low weight at high strength or lower costs at identical physical properties. However, disassociating these materials into their components and recycling them is very intricate. For this reason, the largest part is thermally disposed of, i.e. incinerated. However, this means that the contained raw materials are lost.

For example, consumer or production waste that contains recyclable materials and the largest part of which is currently incinerated or landfilled consists of slags and aluminum dross that are waste products of primary and subsequent processing of metals such as aluminum, slags that are produced when incinerating waste, in particular domestic waste and industry residues, composite materials such as electronic and electrical waste and their partial fractions, aluminum sandwich panels, blister packages, etc. The reason for the common disposal practice rests in the complexity of the mixture and bonding of the recyclable material within these materials, which is why clean disassociation into the components and thus their return into the material cycles are not possible.

Hence, these recyclable materials are taken out of the cycle and have to be replaced with newly extracted resources. The situation is further aggravated by the fact that large amounts of this waste are incinerated in emerging or developing countries or are even dumped in the oceans with severe consequences.

In industrialized countries, relatively small amounts of pre-sorted waste are treated with thermal or wet-chemical processes. Most often, these processes are not very efficient and burden the environment to a significant extent. Moreover, recyclates (reclaimed recyclable materials) are most often produced in insufficient quality and quantity. It is to be stressed that in addition to producing undesirable emissions, such as $CO_2$ and NOR, these processes lead to increased burdens on the environment, in general. Only small amounts of such materials are currently processed in mechanical installations aside from these thermal/chemical processes.

From WO-A-2006/117065, for example, a device for treating composite elements is known in which the composite material is crushed and the small particles are fed to a decomposition device via a supply channel, the decomposition of the composite materials being the result of a stall of a transport fluid and the composite material thus being inevitably crushed to even smaller pieces.

SUMMARY OF THE INVENTION

The object of the present invention was to provide an alternative method and an alternative device that allow composite materials and mixtures, in particular solid-material mixtures and slags, to be decomposed or separated into their material components in preparation for a segregation into the individual components and their return into the economic cycle as raw materials.

The object according to the invention is attained by a method for separating composite materials and mixtures, in particular solid-material mixtures and slags, and by a device which is suitable for carrying out said method. Other embodiments are illustrated in the independent claims.

Proposed is a method for separating composite materials and mixtures, in particular solid-material mixtures and slags, which comprises the step of transporting the composite material or the mixture through a separating device. The composite material to be separated or the mixture to be separated is excited by mechanical impulses as it passes through the separating device and is thereby separated.

The separation, i.e. the decomposition, does not take place by pulverization, crushing, acceleration caused by turbulences or the like, but instead by means of a tribomechanical effect in the boundary-layer surfaces. Tribomechanics refer to the micro-processes taking place in the structure of the boundary surfaces of solid bodies under mechanical action.

Excitation is performed by exposing the material to contact impulses. The strong contact impulse introduces a broad frequency spectrum of vibrations into the material, and the frequencies that match the natural frequencies are absorbed. Owing to the different physical properties, these frequencies differ depending on the material.

This results in an excitation of the interconnected materials, which, because of their different properties, causes high partial forces in the boundary layers, i.e. along the bonded surfaces of the connected materials, and will ultimately lead to a separation of the materials along the boundary layer. This phenomenon is also referred to as tribomechanical decomposition of the composite materials, which is generally very energy-efficient.

In an embodiment of the method according to the invention, the mechanical impulses are transmitted to the composite material or to the mixture in the form of contact impulses. The mechanical impulses are preferably transmitted at a high cadence, preferably in the range of 50 Hz to 50 kHz.

If the cadence is high, the contact impulse is short. Short impulses offer the advantage that they cause an excitation across a broad spectrum. Thus, the chance that the natural frequency of the composite materials and mixtures to be separated is excited as well is particularly high. In other words, the individual impulses cover a broad frequency spectrum and thus excite the natural frequency of the materials. The impulses preferably are Dirac impulses. Furthermore, it is to be noted that the corresponding frequency of the impulses, which is herein referred to as cadence to avoid confusion with the natural frequency, is a result of the speeds of rotation and of the tool distances. The cadence of the contact impulses is preferably in the range of 50 Hz to 50 kHz, more preferably in the range of 250 Hz to 25 kHz and in particular in the range of 1 kHz to 10 kHz.

In another embodiment of the method according to the invention, the composite material or the mixture is pre-crushed, preferably to a size of 5 mm to 50 mm.

To prepare the composite materials and mixtures, they are submitted to a crushing process in which the material, as input for the decomposition process, is crushed to a size of 1 mm to 100 mm, preferably 5 mm to 50 mm, further preferably 8 mm to 40 mm, the size depending on the composite material or mixture. If the layers are relatively thin, as in the case of a blister package (e.g. aluminum layer <40 μm), and the adhesion forces are high, the input material is crushed to a size of about ca. 8 mm to 12 mm in a crusher. Materials having relatively thick layers (>300 μm), such as an aluminum composite panel, may be pre-crushed to 30 mm to 40 mm.

In another embodiment of the method according to the invention, the composite material or the mixture comprises solid organic and/or inorganic composites, such as metal/metal, plastic/metal or plastic/plastic, each with or without mineral proportions.

For example, composite materials include particulate composites, fiber composites, laminates, impregnated composites and structural composites. Chipboards (organic/polymeric), hard metal (inorganic/metallic) and polymer concrete (inorganic/polymeric) are prominent examples of particulate composites. Fiber composites include fiber cements (polymeric/inorganic), glass-fiber-reinforced plastics (inorganic/polymeric) and WDCs (wood-plastic composites). Composite panels such as plywood (nonmetallic/wood), sandwich structures (e.g. aluminum/plastic) and bimetals (metal/metal) are examples of laminated composites. A subgroup of the laminated composites is constituted by composite ply materials (German: Verbundstoffe). They refer to at least two different materials that are connected to each other across their entire surface. Prominent examples include composite packages in general, such as liquid packaging boards (paperboard/metal) and freezer bags (aluminum/plastic), and blister packages (plastic/metal) in particular. Impregnated composites are often used as contact materials in electrical engineering and are composed of plastic or metal and metal or metal carbide. Structural composites usually consist of a fiber/fabric part (e.g. carbon fibers, aramid fibers, glass fibers, etc.) and a material into which they are embedded, such as synthetic resin (e.g. epoxy resin).

In an additional embodiment of the method according to the invention, the composite material or the mixture is at least one of the following materials:

slags and/or aluminum dross that are waste products of primary processing and subsequent processing of metals, in particular aluminum;

slags that are produced when incinerating waste, in particular domestic waste and industrial residues;

composite materials such as electronic and electrical waste and their partial fractions, in particular stranded cables, plug connectors and circuit boards;

printed circuits consisting of a mixture of different composite materials;

aluminum sandwich panels;

blister packages;

tires, in particular car tires;

catalytic converters, in particular automotive catalytic converters.

Composite materials and mixtures occur in various processes and are used in various fields. For instance, slags can occur from the blast-furnace process, i.e. from primary processing of metals, to waste incineration, i.e. the end of the life cycle of a product. Industry branches and sectors in which composite materials and mixtures are frequently used include the automotive industry, the electrical industry, the packaging industry, the building and construction industry, etc.

In another embodiment of the method according to the invention, the composite material or the mixture is supplied with the aid of gravity and takes a spiral path that determines the amount of time spent in the process by the composite material or by the mixture as a function of the size, weight and shape of the composite material or of the mixture.

Supplying the material in this way saves energy on the one hand and allows the different composite materials and mixtures supplied to be pre-separated on the other hand. When the composite materials and mixtures are subsequently excited by the contact impulses and thus separated into the individual materials of which they were composed, these materials now detached from the composite are already "pre-separated" (i.e. not mixed with materials that originate from composite materials and mixtures that need to spend a different amount of time in the process) as well, which facilitates their subsequent segregation into the individual components.

In another embodiment of the method according to the invention, the amount of time spent in the process by the composite material or by the mixture is additionally influenced by the addition of a gas flow.

Supplying such a gas flow can additionally influence the effect of the size, weight and shape of the composite material or of the mixture on the amount of time spent in the process. For example, if a counter flow (i.e. a gas flow directed against the supply direction of the material) is used, particles (i.e. pre-crushed composite materials/mixtures) of low density will settle significantly more slowly, whereas the effect on particles of the same size with higher density is less pronounced. The same applies to particles of identical density and differing cross-sectional area. The resistance of the particles increases as the cross-section grows, and the effect of the counter flow will therefore be more pronounced the larger the cross-section becomes. If the gas flow is not directed against the supply direction of the material but in the same direction, the supply of the particles can be accelerated and the differences in the amount of time spent in the process by particles of differing size/cross-section etc. can be reduced.

In an additional embodiment of the method according to the invention, the material resulting from the separation of the composite material or of the mixture is segregated into its components using at least one of the following means:

sieve
fluidized-bed separator
sifter
corona separator
sedimentation tank

The method according to the invention has the big advantage that the individual materials present in the composite material can be selectively separated from each other as a function of their different physical properties, such as density, elasticity, ductility, etc., because they behave differently during the process, i.e. during decomposition, and thus vary in structure and particle size.

The invention also relates to a device for carrying out the method according to the invention for separating composite materials and mixtures, in particular solid-material mixtures and slags. Said device comprises a drive unit for driving a bearing/shaft unit having an axis of rotation which is hereinafter referred to as the X-axis and which is substantially parallel to the force of gravity. Furthermore, the device comprises a rotor element, which is connected to the bearing/shaft unit and which is part of a rotor unit. The rotor element itself has at least one rotor tool and each rotor tool has at least one rotor tool component. The rotor element is surrounded by a stator element, which is part of a stator unit. The stator element itself has at least one stator tool and each stator tool has at least one stator tool component. The rotor element and the stator element are substantially cylindrical. The device additionally comprises a material inlet for supplying the composite material or the mixture above the rotor/stator unit and a material outlet for discharging the separated material below the rotor/stator unit.

In a device in which the composite material or the mixture is supplied in bulk, the composite material or the mixture is abruptly accelerated by the tools (contact impulse) and decelerated (contact impulse) again within a few milliseconds. Acceleration and deceleration are repeated at a high frequency or cadence. This causes the natural frequencies of the different materials of which the composite material or the mixture is composed to become excited. Because of the different natural frequencies of the materials, large forces occur especially at the material boundary surfaces, leading to the separation of the different materials from each other.

In principle, the device could also be configured such that the stator element would be surrounded by the rotor element. In this case, however, the rotor element would be bigger than the stator element, which would mean that the bigger one of the two parts would have to be driven by the drive unit. It is more energy-efficient if the smaller and thus usually the lighter part is moved and the bigger and thus usually heavier part is still.

The drive unit driving the rotor element can comprise a motor or a hydraulic drive, for example, which can be driven by electricity, solar energy, wind energy, hydroelectric power or fuels such as diesel, gasoline or wood.

Both the rotor unit and the stator unit can be changed in their entirety (quick-change system). The actual tool change thus happens in a quick-change device outside of the machine. Both the rotor tools and the stator tools are changed or replaced by being lowered within said device. Through this lowering, new wear parts are introduced from below and the worn, consumed wear parts are ejected at the top.

The rotor element is mounted in a self-stabilizing manner like a turbine.

Since due to production not all tools and tool components have the same mass, positioning of the tools is preferably computer-assisted. This means that the individual tools (e.g. of the rotor element) are first weighed and their target position is then calculated by a computer. The aim is for the tools to be ultimately disposed in such a manner that there is no unbalance (e.g. of the rotor element) and thus no balancing is required. The process of computer-assisted target-position determination can also be performed based on the individual tool components instead of the tools, which may comprise multiple tool components.

The tools and their tool components are preferably made of metal, in particular cast steel. The tools and their tool components have sharp edges; however, these become blunt and rounded over the course of use. If this aging process progresses too far and affects the quality of separation of the composite materials and mixtures, they have to be replaced or changed.

In an embodiment of the device according to the invention, the composite material or the mixture is excited by mechanical impulses in a cleared gap between the at least one rotor tool and the at least one stator tool.

The pre-crushed composite material or the pre-crushed mixture, also called bulk good, is supplied to the device according to the invention via the material inlet and enters into the gaps between the tools disposed on the rotor element and on the stator element. In these gaps, the mechanical impulses are then transmitted to the composite material or to the mixture by abrupt acceleration and deceleration of the particles (i.e. pre-crushed composite materials/mixtures) present in the process.

In another embodiment of the device according to the invention, the at least one rotor tool and the at least one rotor tool component are substantially oriented in the direction of the X-axis. The X-axis describes the axis of rotation of the bearing/shaft unit and is substantially parallel to the force of gravity. The X-direction and the tangential direction of the stator elements together define a plane A at the position of the at least one stator tool component, and the X-direction and the radial direction of the stator element together define a plane B at the position of the at least one stator tool component. The at least one stator tool component can be oriented relative to the X-axis both in plane A and in plane B.

The orientability of the at least one stator tool component relative to the X-axis and thus also relative to the at least one rotor tool component, which is oriented substantially parallel in the direction of the X-axis, allows the device to be configured for different materials. Thereby, material-specific conditions can be achieved in the process.

Herein, the orientation of the at least one stator tool component relative to the X-axis is primarily described; however, the at least one rotor tool component could be oriented relative to the X-axis as well, and the at least one stator tool component could substantially be oriented in the direction of the X-axis, i.e. in the X-direction. Also, both tool components (stator and rotor) could be adjusted relative to the X-axis.

However, the primarily described embodiment, in which only the stator tools are oriented, is the most advantageous because it provides for maximum service life of both the stator unit and the rotor unit. The rotor unit is already subject to additional stresses and to additional wear because it is in motion during the process. If the tool components of the rotor unit are adjusted, this would mean that the rotor element would comprise additional moving components, which might make the rotor element more susceptible to material fatigue, failure, etc. By distributing the potential weaknesses between the rotor element and the stator element, the service life of both of these elements may be increased.

In another embodiment of the device according to the invention, an angle α, which describes the orientation in plane A relative to the X-axis, is preferably between −45° and +45°, and an angle ß, which describes the orientation in plane B relative to the X-axis, is preferably between −10° and +10°.

If the angles are set to the values described above, an ideal or particularly good separation result can be achieved for nearly any composite material and any mixture and can be adjusted individually. At the same time, the device is operated with low wear, i.e. the stress on the material of the stator tools and rotor tools is reduced while a good separation result is achieved at the same time. In a particularly preferred embodiment of the device, the angle α is preferably between −35° and +35°, in particular between −25° and +25°, and the angle ß is preferably between −8° and +8°, in particular between −5° and +5°.

In an additional embodiment of the device according to the invention, the device has a metering device for the composite material or the mixture, which is disposed upstream of the material inlet and allows supplying the composite material or the mixture with the aid of gravity and in a spiral motion. Since continuous operation of the device is particularly advantageous, the composite material or the mixture to be separated should be supplied continuously as well. If the supply is continuous, it is advantageous for the supplied original material (composite material/mixture) to be metered. The material supply can then be adjusted to the type of composite material or mixture, to the amount of time spent in the process by the composite material or the mixture, etc.

In another embodiment of the device according to the invention, at least one of the following means is disposed downstream of the rotor/stator element:
sieve
fluidized-bed separator
sifter
corona separator
sedimentation tank Decomposition, i.e. separation, of the materials that were previously part of the composite material or of the mixture in the device is followed by segregation into the different components. Sieves, fluidized-bed separators, sifters, corona separators and sedimentation tanks are preferably used for this purpose.

However, segregation into the individual components of the separated materials can take place using various techniques and based on different chemical and physical properties. For instance, segregation can rely on different particle sizes (e.g. sieve), but also on differences in density and inertia (e.g. sifter). Also, segregation can happen electrostatically, as in the case of corona separation, for example. Furthermore, wet segregation techniques can be applied as well, e.g. based on differences in solubility.

Segregation methods can generally be of a thermal or mechanical nature. Thermal methods can be based on boiling points (rectification, distillation, drying, stripping, etc.) or freezing points (separation by freezing, crystallization, etc.), sublimation vapor pressures (sublimation, etc.) or solubility (chromatography, washing, (solid material) extraction, absorption, adsorption, elution, etc.), for example. Mechanical methods are based on surface wettability (flotation, etc.), density (sedimentation, decantation, deposition, centrifugation, heavy-media separation, elutriation, etc.), particle size (filtration, screening, sieving, sifting, membrane separation techniques, reverse osmosis, etc.), particle inertia (cyclone, impactor, jet deflection sifter, free-flight separation, etc.), magnetizability (magnetic separation, eddy current separation, etc.) and electrical mobility (electrostatic dust separator, corona separator, etc.), for example. Moreover, segregation by chemical reactions (etching, electrolysis, electrophoresis, precipitation, ion exchange, roasting, zone melting, cupellation, segregation, etc.) is possible.

Furthermore, the downstream segregation process profits from one differing material property in particular: ductility. Ductile materials are plastically deformed and adopt a compact sphere structure which has almost the density of the corresponding substance. Plastic materials more or less retain their structure. This characteristic allows easier segregation by the segregation method employed.

In another embodiment of the device according to the invention, the device comprises a gas inlet, which is preferably disposed in the area of the rotor/stator element. A gas flow introduced through a gas inlet can influence the amount of time spent in the process by the composite material or by the mixture, for example. If the gas inlet is disposed in the proximity of the material inlet, the supply of composite material or of the mixture can be influenced, for example. If the gas inlet is disposed in the area of the rotor/stator element, the amount of time spent in the cleared gap between the at least one rotor tool and the at least one stator tool by the composite material or by the mixture and thus the duration for which mechanical impulses excite the composite material or the mixture can be influenced, for example. If the gas inlet is disposed downstream of the area of the rotor/stator element, the gas flow introduced through it can be part of the segregation process. If the gas inlet is disposed in the proximity of the material outlet, the speed at which the segregated components are discharged can be influenced.

It is explicitly noted that any combination of the examples and embodiments above or combinations of combinations can be the subject-matter of another combination. The only combinations excluded are those that would lead to a contradiction.

Examples of the application and examples of embodiments of the present invention are explained in more detail below with reference to the drawing.

DETAILED DESCRIPTION

The following embodiments are examples and are not intended to limit the invention in any way.

Figure 1:
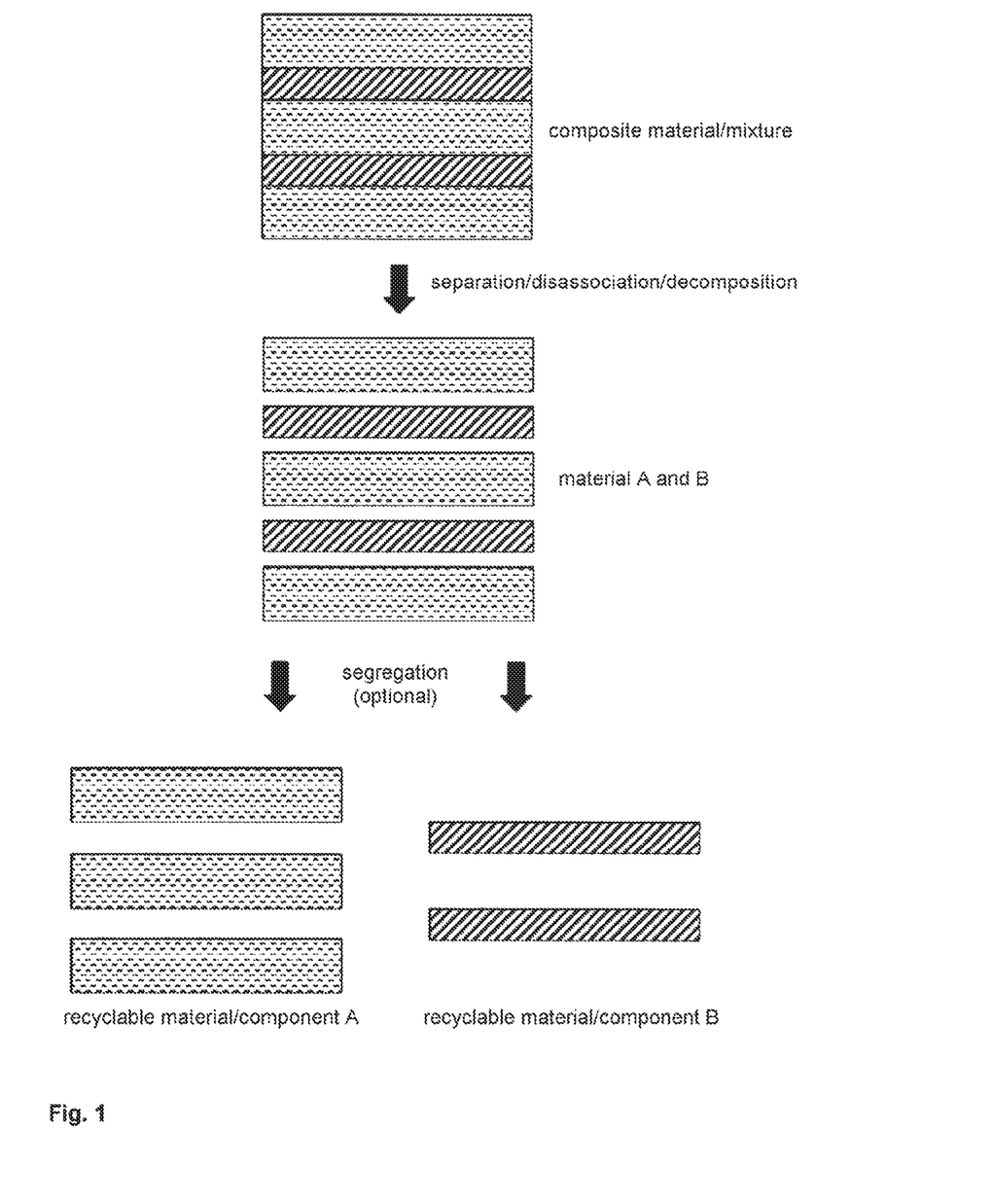
FIG. 1 schematically shows the method according to the invention including the severing of the bond between the materials and the optional segregation of the separated materials from each other.

FIG. 1 schematically shows the different steps of one embodiment of the method according to the invention. First, the bond at the contact surfaces of the different materials of the composite material or of the mixture is severed (i.e. broken up or decomposed) and then the different materials can optionally be segregated from each other so as to recover the homogenous recyclable material (i.e. the original components of the composite material/mixture).

Figure 2:
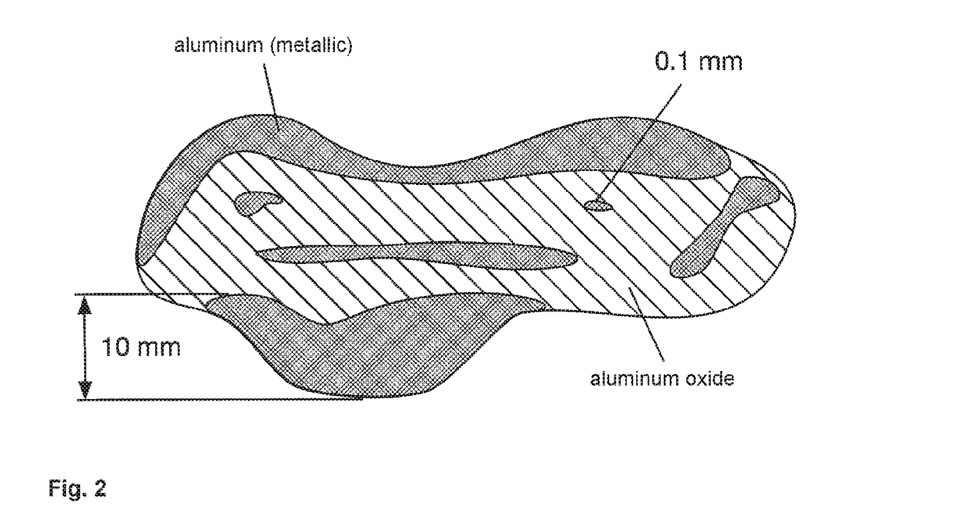
FIG. 2 schematically shows a possible structure of the slag or aluminum dross that occurs during both primary processing and subsequent processing of metals, in particular of aluminum.

FIG. 2 shows a possible structure of the waste products slag and aluminum dross that occur both in primary processing and in subsequent processing of metals, in particular aluminum. During a reduction process, in which aluminum oxides are processed into metallic aluminum, for example, a layer consisting of metallic aluminum and aluminum oxides forms on the surface of the aluminum prior to its casting. This layer is a result of oxidation at the surface and is mechanically scraped of, i.e. skimmed, which is why dross is also referred to as scum.

The structure of the dross is a chaotic assortment of aluminum and aluminum oxides, as illustrated in FIG. 2. In the inhomogeneous layer, the aluminum can be found in pieces of a size between a few micrometers to up to several millimeters. The proportion of metallic aluminum usually amounts to between 25 and 80 wt %.

Figure 3:
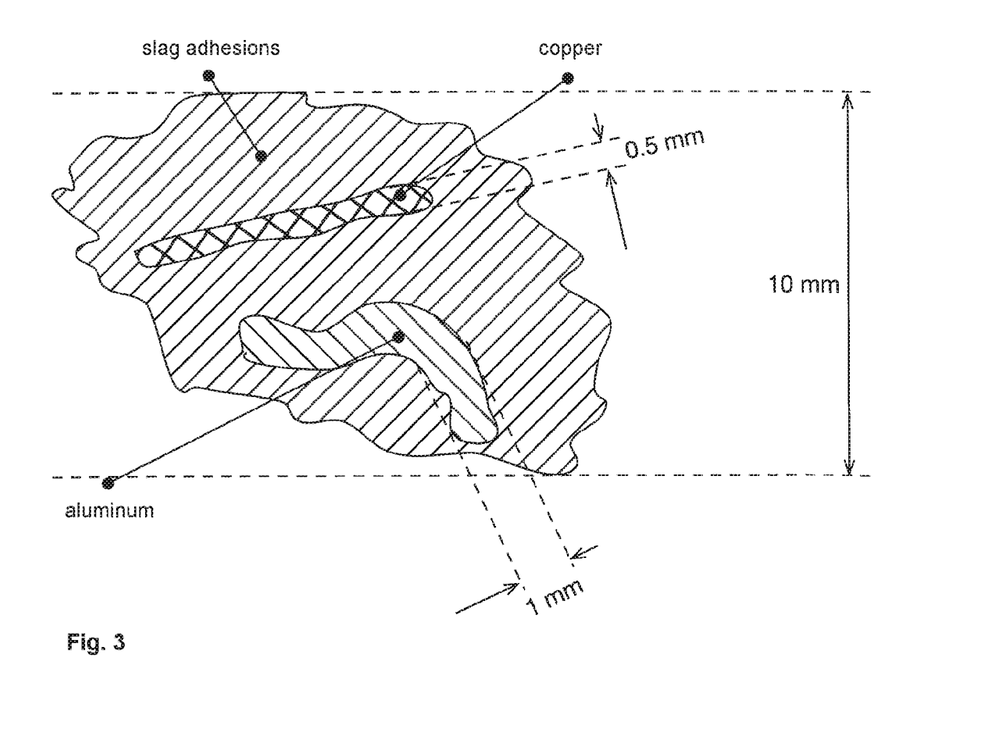
FIG. 3 schematically shows a possible structure of the slag that is produced when incinerating waste, in particular domestic waste and industrial residues.

FIG. 3 shows a possible structure of a slag that is produced when incinerating waste, in particular domestic waste and industry residues. In addition to a mineral mixture, this type of slag often contains proportions of heavy and light metals, which are mostly present in metallic form, i.e. not as oxides.

After leaving the incineration process and after intermediate storage, these slags are typically subjected to segregation by means of an induction separator (non-ferrous metals) and a magnetic separator (steel).

The fraction leaving the induction separator consists of light metals, manly aluminum, of heavy metals, mainly copper, and of other mineral substances.

Figure 4:
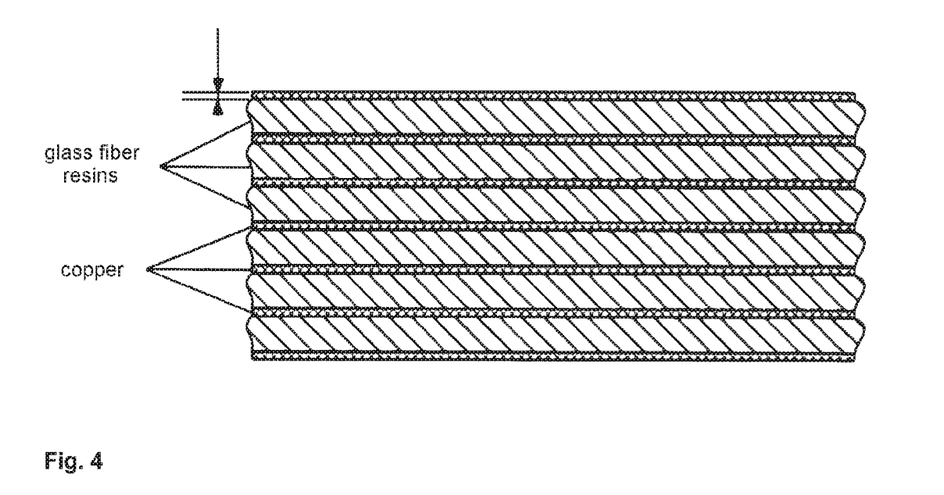
FIG. 4 schematically shows a possible structure of a composite material consisting of copper and glass-fiber resins.

FIG. 4 shows a possible structure of a composite material consisting of copper and glass-fiber resins. Composite materials such as electronic and electrical waste as well as their partial fractions, such as stranded cables, plug connectors and circuit boards or printed circuits, consisting of a mixture of different materials, contain a plurality of valuable metals and precious metals. These materials, which consist of different sizes and compositions, are often interlaced in a complex structure and are considered difficult to separate. As illustrated, these materials can consist of multilayer composites of up to 40 layers of copper having a thickness of about 17 micrometers and of glass-fiber epoxy resins (e.g. FR4), for example.

Figure 5:
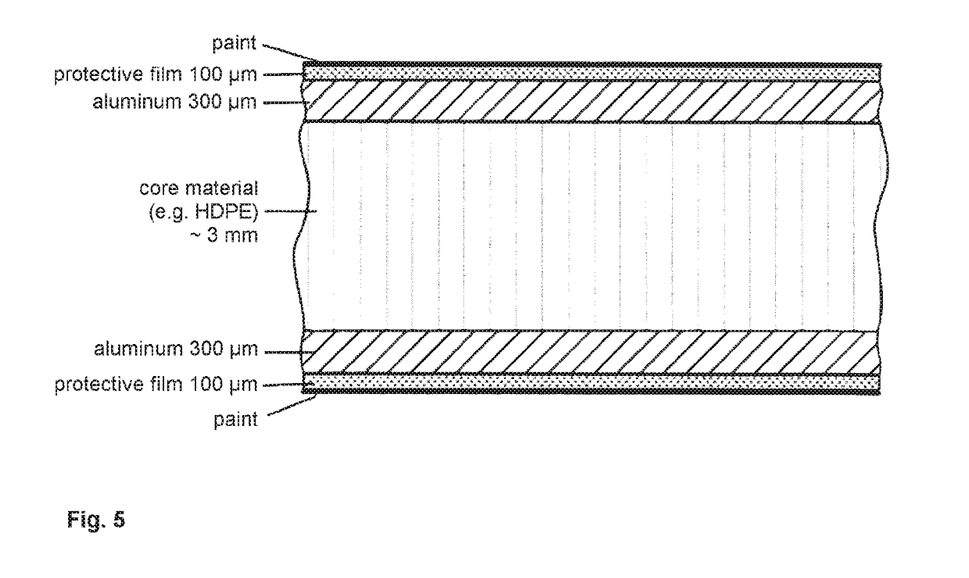
FIG. 5 schematically shows a possible structure of an aluminum sandwich panel.

FIG. 5 shows a possible structure of an aluminum sandwich panel consisting of two layers of aluminum having a thickness of about 0.3 mm, which is usually painted on one side and protected by a plastic film on the outer side. A layer of HDPE or other plastics of about 1 mm to 8 mm thickness is located between the aluminum layers. These composite panels are used in façade construction or in vehicle manufacture, for example. The material is characterized in particular by being very durable and light.

Figure 6:
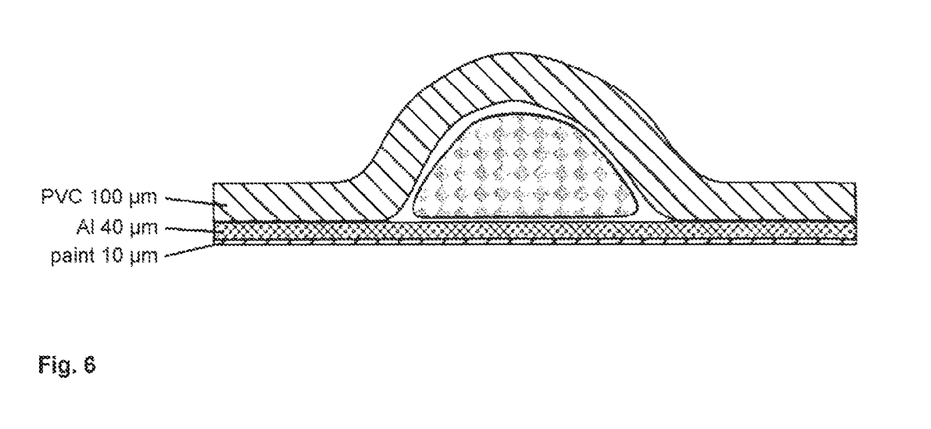
FIG. 6 schematically shows a possible structure of a blister package.
Figure 7:
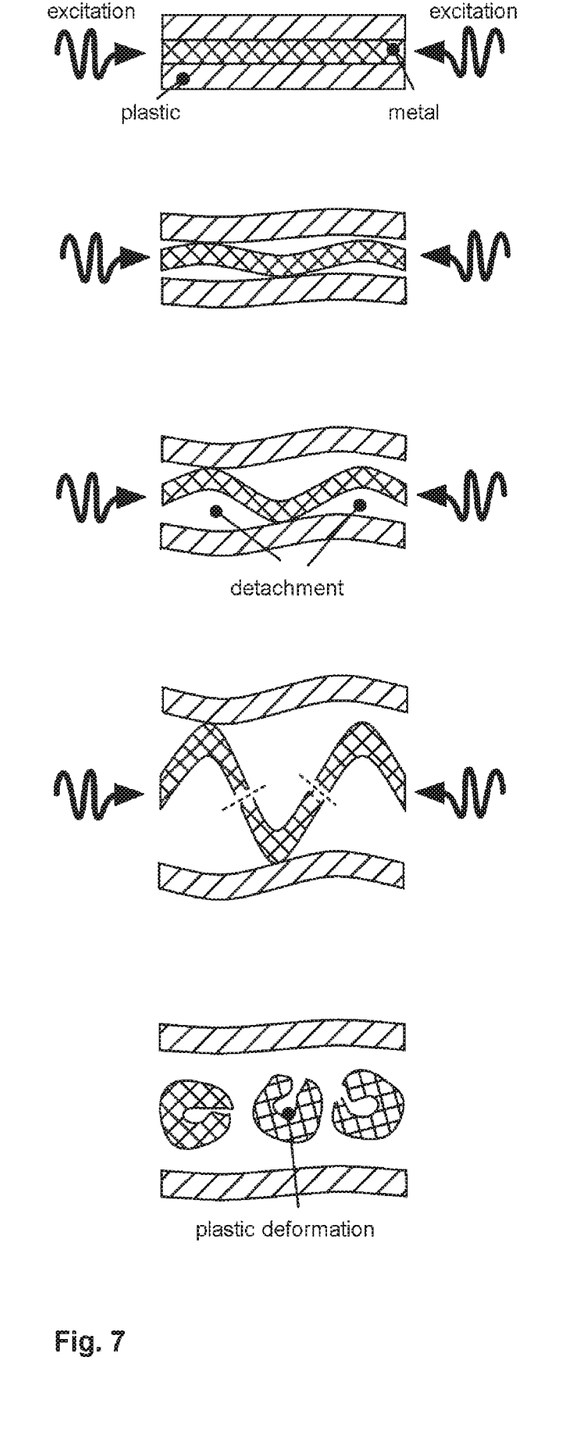
FIG. 7 schematically shows the decomposition process.

FIG. 6 shows a possible structure of a blister package as used in the medical field, for example, which consists of a deep-drawn plastic film, usually PVC, and a printed aluminum foil, which covers the PVC film with the hollow body (blister). FIG. 7 schematically shows the decomposition process, i.e. the separation of the materials present in the composite material or in the mixture. At the beginning, the composite material or the mixture is excited by mechanical impulses. The different materials, which are plastic and metal in this example, absorb the impulse and start vibrating at their natural frequency. Particularly high forces occur at the material boundary surfaces because of the different natural frequencies of the materials. Ultimately, the materials are separated along the material boundary. Furthermore, the impulse transmission can lead to plastic deformation due to differences in ductility of the materials, such as in the case of metal. This facilitates segregation of the materials into the individual components.

The method according to the invention is carried out in a device in which the principle of dry-mechanical treatment is substantially employed. The idea is for the individual materials to be separated from each other and to then be segregated into individual components. To achieve this, the differences in the physical properties of the materials present in the mixture or in the composite material are exploited. In principal, these different properties lead to different behaviors of the materials. Broadly speaking, plastics or rubber tend to act as vibration dampeners and absorb a lot of energy while still behaving elastically and returning to their original shape. Metals, on the other hand, transmit the vibration energy. As soon as the metals have separated from other materials, the high impulse forces will cause the metals to deform substantially plastically, i.e. to turn into spheres.

Mineral substances are downright pulverized because of their brittleness.

Aside from the separation along the material surfaces, the method also leads to a change in shape of the individual particles. This means that the particle-size spectrum changes as a function of the properties. The different particle-size distributions overlap only partially, which is how they allow homogeneous segregation into individual components in the first place.

The obtained homogeneous components, i.e. materials, can subsequently be made available to the economic cycle. In doing so, resources are conserved and a significant amount of $CO_2$ is saved.

Figure 8:
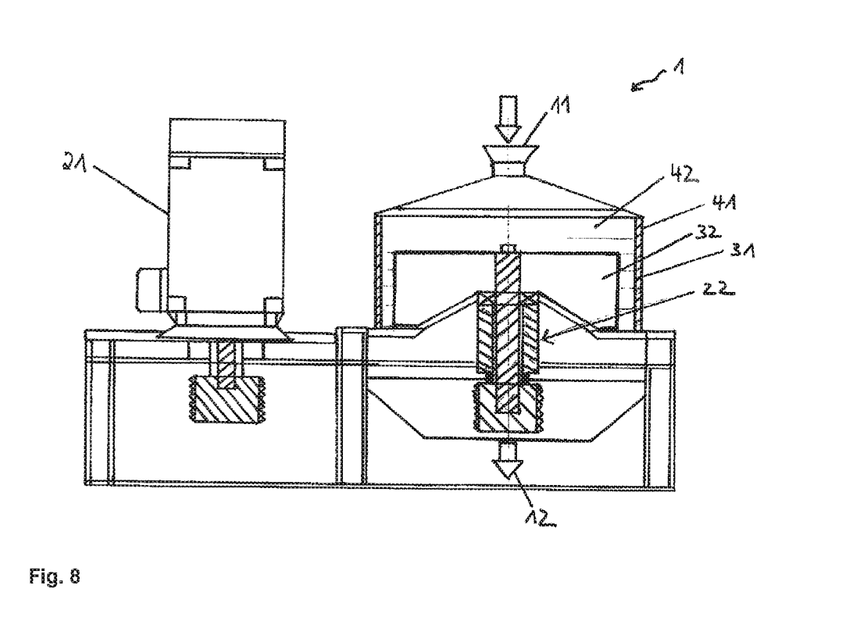
FIG. 8 schematically shows a possible structure of a device for disassociating composite materials and mixtures, in particular solid-material mixtures and slags.

FIG. 8 shows a possible structure of a device for separating composite materials and mixtures, in particular solid-material mixtures and slags. A drive unit (e.g. an electric motor) 21 and a bearing/shaft unit 22 including the associated rotor element 32 are disposed on a machine substructure 20. On said rotor element 32, at least one rotor tool 33 is located, which, in turn, comprises rotor tool components 34. Likewise, a stator unit 41 including the stator element 42 and the at least one associated stator tool 43, which, in turn comprises stator tool components 44, is mounted in said machine substructure. The illustrated device further comprises a material inlet 11, via which the composite material etc. is supplied in bulk, and a material outlet 12, via which separated materials and, if applicable, already segregated components are discharged.

Introducing the material into the device 1 from above allows the material to be transported downward by gravity and in a spiral motion. This spiral path provides for the different amounts of time spent in the process by the material as a function of size, weight and shape of the material.

Figure 9:
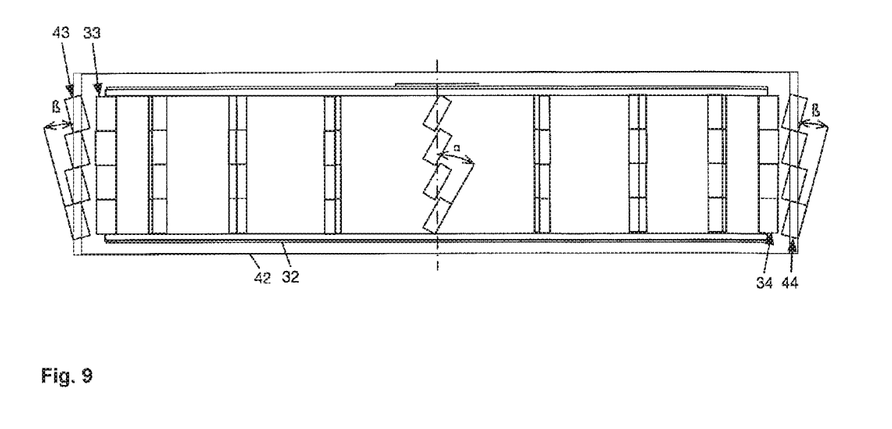
FIG. 9 schematically shows a cross-section of a possible embodiment of a tool used to decompose composite materials, slags and mixtures.

FIG. 9 shows a possible embodiment of the tool that is used to separate composite materials and mixtures. In a manner of speaking, it is an enlarged section of the rotor unit 31 and stator unit 41 illustrated in FIG. 8. FIG. 9 particularly clearly shows the geometry of the tools. The gap cleared between the rotor tools 33 and the stator tools 43 is the area in which the material is substantially acted upon, i.e. in which the material is decomposed.

The possible range of angle α, which describes the orientation in plane A relative to the X-axis, is preferably −45° to +45°, and angle ß, which describes the orientation in plane B relative to the X-axis, is preferably between −10° to +10°. The amount of time spent in the process and the type of contact impulse can be set by adjusting the angle of the stator tools relative to the rotor tools. Likewise, the wear behavior of the tools can be improved by said orientation.

By adding an air flow, the amount of time spent in the process by the material can be influenced additionally.

Figure 10:
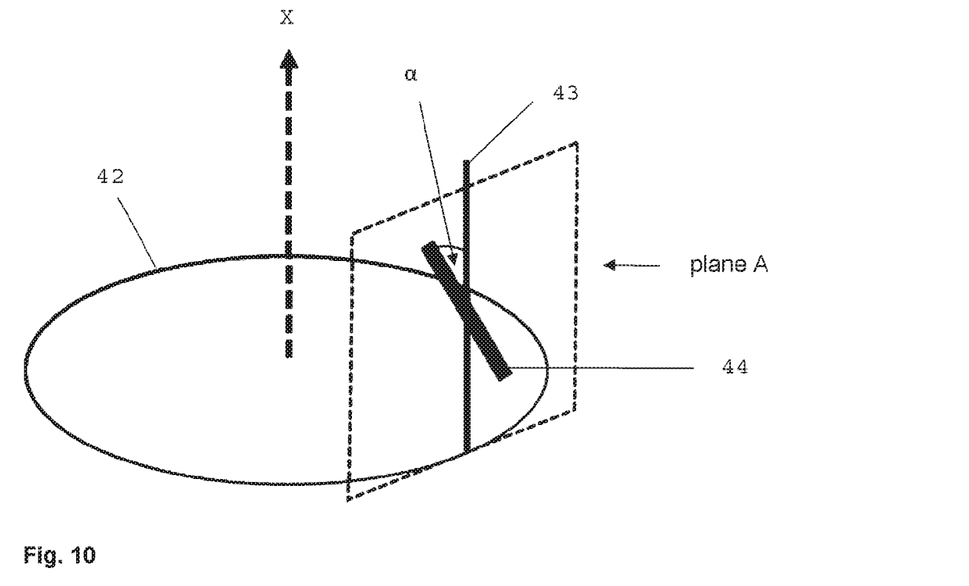
FIG. 10 schematically shows plane A, which is defined by the X-direction and the tangential direction of the stator element 42 at the position of the at least one stator tool component 44 and in which angle α is located.

FIG. 10 schematically shows a stator element 42, on which a stator tool 43 is disposed, which, in turn, comprises a stator tool component 44. The X-axis, which describes the axis of rotation of the bearing/shaft unit 22, is indicated as well, the axis of rotation being substantially parallel to the force of gravity. At the position at which the stator tool component 43 is disposed on the stator tool 43 of the stator element 42, the X-direction and the tangential direction of the stator element 42 together define a plane A. Angle α describes the orientation of the stator tool component in plane A relative to the X-axis.

Figure 11:
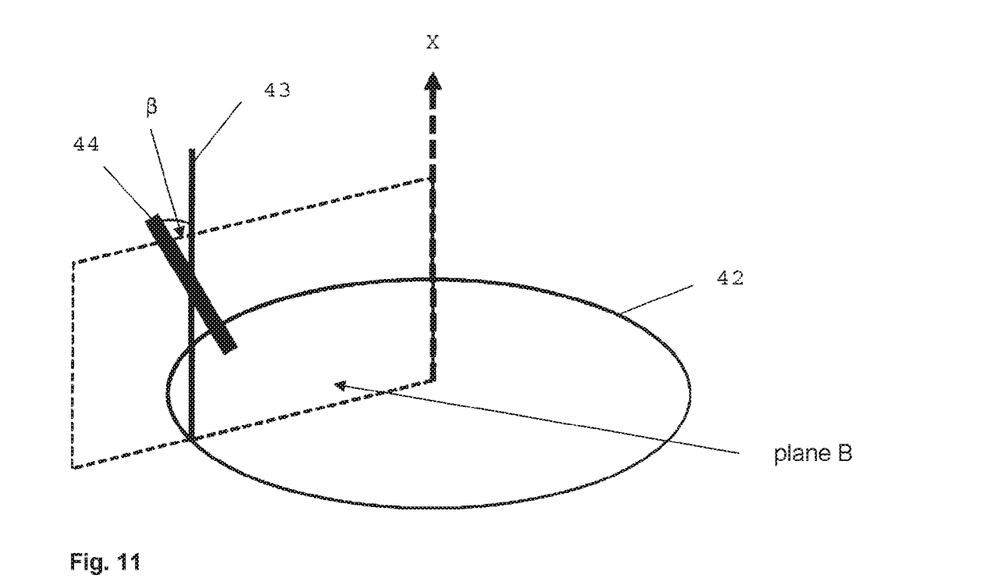
FIG. 11 schematically shows plane B, which is defined by the X-direction and the radial direction of the stator element 42 at the position of the at least one stator tool component 44 and in which angle ß is located.

FIG. 11 schematically shows a stator element 42, on which a stator tool 43 is disposed, which, in turn, comprises a stator tool component 44. The X-axis, which describes the axis of rotation of the der bearing/shaft unit 22, is indicated as well, the axis of rotation being substantially parallel to the force of gravity. At the position at which the stator tool component 43 is disposed on the stator tool 43 of the stator element 42, the X-direction and the radial direction of the stator element 42 together define a plane B. Angle ß describes the orientation of the stator tool component in plane B relative to the X-axis.

REFERENCE SIGNS

1 device
11 material inlet
12 material outlet
21 drive unit
22 bearing/shaft unit
31 rotor unit
32 rotor element
33 rotor tool
34 rotor tool component
41 stator unit
42 stator element
43 stator tool
44 stator tool component
X axis of rotation of the bearing/shaft unit; substantially parallel to the force of gravity
plane A plane defined by the X-direction and the tangential direction of a stator element
plane B plane defined by the X-direction and the radial direction of a stator element

The invention claimed is:

1. A device for carrying out a method for separating composite materials and mixtures, wherein the device (1) comprises
    a drive unit (21) for driving a rotor element (32) which is connected to a bearing/shaft unit (22) having an axis of rotation which is hereinafter referred to as the X-axis and which is parallel to the force of gravity, the rotor element (32) being part of a rotor unit (31), the rotor element (32) itself having at least one rotor tool (33) and each rotor tool (33) having at least one rotor tool component (34), the rotor element (32) being surrounded by a stator element (42), which is part of a stator unit (41),
    the stator element (42) itself having at least one stator tool (43) and each stator tool (43) having at least one stator tool component (44), the rotor element (32) and the stator element (42) being cylindrical and the device additionally comprising a material inlet (11) for supplying the composite material and the mixture above the rotor unit and the stator unit (31, 41) and a material outlet (12) for discharging a separated material below the rotor unit and the stator unit (31, 41),
    wherein the at least one rotor tool (33) and the at least one rotor tool component (34) are oriented in a direction of the X-axis, hereinafter referred to as the X-direction, the X-direction and a tangential direction of the stator element (42) together defining a plane A at a position of the at least one stator tool component (44), and the X-direction and a radial direction of the stator element (42) together defining a plane B at the position of the at least one stator tool component (44), the at least one stator tool component (44) being adjustable relative to the X-direction both in plane A and in plane B, and
    wherein an angle α describes an orientation of the at least one stator tool component (44) in plane A relative to the X-direction, and wherein the at least one stator tool component (44) is adjustable from an angle α of −45° to an angle α of +45°, and wherein an angle β describes an orientation of the at least one stator tool component (44) in plane B relative to the X-direction, and the at least one stator tool component (44) is adjustable from an angle β of −10° to an angle β of +10°.

2. The device according to claim 1, wherein the composite material and the mixture is excited by mechanical impulses in a cleared gap between the at least one rotor tool (33) and the at least one stator tool (43).

3. The device according to claim 1, comprising a metering device for the composite material and for the mixture, the metering device being disposed upstream of the material inlet (11) and allowing the composite material and the mixture to be supplied by gravity and in a spiral motion.

4. The device according to claim 1, wherein the device comprises a gas inlet, which is disposed in an area of the rotor element and the stator element (32, 42).

\* \* \* \* \*